United States Patent [19]

L'Her et al.

[11] Patent Number: 5,352,528
[45] Date of Patent: Oct. 4, 1994

[54] LAMINATED PANE

[75] Inventors: Anne L'Her; Pascal Chartier, both of Paris; Joël Robineau, Noisy le Grand, all of France

[73] Assignee: Saint-Gobain Vitrage International, Courbevoie, France

[21] Appl. No.: 57,832

[22] Filed: May 7, 1993

[30] Foreign Application Priority Data

May 7, 1992 [FR]  France ................. 92 05623

[51] Int. Cl.⁵ .............................................. B32B 17/06
[52] U.S. Cl. ...................................... 428/426; 428/441; 428/442; 156/106; 156/306.6
[58] Field of Search .............. 428/429, 441, 442, 447, 428/412, 423.1, 423.6, 426; 156/106, 306.6

[56] References Cited

U.S. PATENT DOCUMENTS

| | | | |
|---|---|---|---|
| 4,137,364 | 1/1979 | Ball, III et al. | 428/412 |
| 4,303,739 | 12/1981 | Beckmann et al. | 428/429 |
| 4,622,249 | 11/1986 | Bowser | 428/34 |
| 4,668,574 | 5/1987 | Bolton et al. | 428/339 |
| 4,705,721 | 11/1987 | Frisch et al. | 428/412 |
| 4,741,961 | 5/1988 | Frisch et al. | 428/412 |
| 4,952,460 | 8/1990 | Beckmann et al. | 428/441 |
| 5,302,447 | 4/1994 | Ogata et al. | 428/288 |

Primary Examiner—Patrick J. Ryan
Assistant Examiner—William A. Krynski
Attorney, Agent, or Firm—Oblon, Spivak, McClelland, Maier & Neustadt

[57] ABSTRACT

Laminated pane, comprising at least one glass sheet, and at least one film of plastics material. Between the film of plastics material and the glass sheet there Is disposed an adhesive film of a material having the property of an adhesion to the glas. The adhesive film is selected so that it adheres more strongly to the glass than to the plastics material.

20 Claims, 1 Drawing Sheet

LAMINATED PANE

BACKGROUND OF THE INVENTION

1. Field of the Invention

This invention concerns a laminated pane, comprising an adhesive film disposed in between at least one glass sheet and at least one sheet of plastics material. The adhesive film has the characteristic of greater adhesion to the glass sheet than to the sheet of plastic material. The laminates are especially useful as safety panes in buildings and vehicles.

2. Discussion of the Background

Laminated panes for buildings or transportation vehicles are generally constructed of two glass sheets, between which is placed a sheet of thermoplastics polymer. Commonly, the thermoplastic polymer comprises polyvinyl butyral (PVB).

PVB is used as intermediate sheet because it has a high tension modulus, it exhibits considerable elongation at rupture, and because it is an efficient energy-absorber. Therefore, it can effectively withstand impact. At the same time, PVB has a relatively high adhesion to glass. Therefore, if the glass shatters or splinters as a result of impact or breakage of the pane, the broken glass has a tendency to be retained by the PVB.

PVB, however, is not entirely satisfactory because it is considered relatively expensive. Furthermore, properties other than energy absorption and adhesion to the glass are often desired, depending on the application. The final laminate is therefore often the result of a compromise between various properties.

As an example, U.S. Pat. No. 4,600,627, teaches a laminated pane including a plurality of sheets of plastics material between two glass substrates. The plurality of sheets comprise a central sheet of a first plastics material, such as polyester or polyvinyl chloride (PVC), disposed between two sheets made of a material which serves to adhere the intermediate sheet and the glass sheets. As exemplified in the reference, these two sheets may be based upon a copolymer of ethylene and of vinyl acetate (EVA) and may have a thickness of around 0.2 mm. This structure has several problems, however. In particular, the sheets of EVA do not have adequate adhesive properties and, more importantly, the laminated pane cannot withstand extremes of temperature.

SUMMARY OF THE INVENTION

Accordingly, one object of the invention is to provide a laminated pane structure having optical and mechanical characteristics which are appropriate for use as a safety pane, notably for buildings and for motor vehicles.

A second object of the invention is to provide a laminated pane with excellent aging behavior, i.e., which can withstand extremes of temperature without adverse effects.

Still a further object is to provide a laminated pane that is less expensive to manufacture and yet is more effective in terms of safety than PVB-based panes.

These and other objects are achieved by providing a laminated pane comprising an adhesive film disposed in between a glass sheet and a sheet of plastics material, wherein the adhesive film has a stronger adhesion to glass than to the sheet of plastics material.

According to one preferred embodiment of this invention, the laminated pane comprises a structure composed of two glass sheets and a composite intermediate assembly formed of a core of PVC disposed between two adhesive films. The adhesive films are characterized as having, according to the shear test (discussed below), a greater adhesion for the glass than for the PVC.

This pane may be used as a building pane or transportation vehicle pane (e.g., a windshield).

According to another preferred embodiment of the invention, the pane has a structure composed of one glass sheet and one rigid sheet of plastics material, preferably of polycarbonate or polymethyl methacrylate. The glass sheet and rigid sheet of plastics material are connected together by the composite intermediate assembly formed of a film of PVC and at least one adhesive film having the properties indicated above between glass and PVC, and possibly also another adhesive film of this type or of a different type, disposed between the PVC and the sheet of rigid plastics material.

This pane may be used as a burglar proof or bullet proof pane, for example.

Other forms of embodiment of the pane of this invention using a glass sheet and a PVC film separated from the glass sheet by an adhesive film having the properties indicated above may also be envisaged.

BRIEF DESCRIPTION OF THE DRAWINGS

Various other objects, features and attendant advantages of the present invention will be more fully appreciated as the same becomes better understood from the following detailed description when considered in connection with the accompanying drawing in which like reference characters designate like or corresponding parts.

DESCRIPTION OF THE PREFERRED EMBODIMENTS

Figure 1:
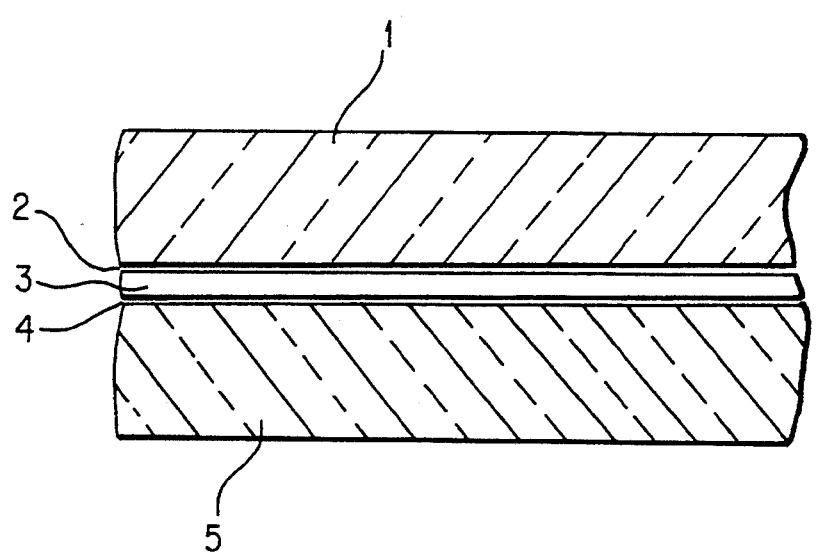
FIG. 1 shows a laminated pane according to one embodiment of the invention. A central film 3 of PVC is disposed between terpolymer films 2, 4 which are in turn disposed between glass substrates 1, 5.

The laminated pane according to this invention comprises at least one glass sheet and one film of material based upon a plastics material, such as polyvinyl chloride (PVC), wherein an adhesive film is disposed between the glass sheet and the plastics material. The adhesive film preferably has the property of greater adhesion to the glass than to the plastics material. By developing an intermediate sheet for laminated pane which is a composite and which associates at least one very special adhesive film with a plastics material such as PVC, the invention optimizes the aforementioned desired characteristics of a laminated pane.

The laminate of the present invention is clearly differentiated from PVB-type panes as follows:

In the case of a pane comprising a sheet of the PVB-type, if the composition is adjusted to increase its adhesion to the glass (and thus increase its capacity for retaining the glass splinters in a breakage), its energy absorption capacity is decreased.

In contrast, the adhesive film of the present invention, adhering strongly to the glass, effectively retains the glass splinters in the case of a breakage. Furthermore, it adheres sufficiently to the PVC-based film to hold it firmly in place in the pane without, however, altering the energy absorption properties of this PVC-based film.

The use of a composite intermediate sheet makes possible a separate optimization of the two essential functions of a laminated pane, and thus opens up a much wider range of possibilities than the use of a single intermediate sheet.

Adhesive Film

For the production of a laminated pane according to this invention, an adhesive film will preferably be chosen which, according to the shear test for the laminated pane (discussed below), has a better adhesion to the glass than to the film of plastics material.

Such an adhesive film is, for example, a terpolymer preferably of ethylene, acrylic ester and maleic anhydride, or a film of a terpolymer of ethylene, vinyl acetate and maleic anhydride, the percentage by weight of maleic anhydride in these terpolymers being between 0.1 and 5%.

One particularly preferred embodiment of the composite according to this invention uses, as adhesive film, a terpolymer of ethylene, vinyl acetate and maleic anhydride, in which the quantity of maleic anhydride is adjusted to a percentage by weight of between 0.1 and 5%, most preferably between 0.5 and 2%. It in important to observe this proportion of anhydride, because it is this monomer that enables the surprisingly strong adhesion of the adhesive film to the glass and to the film of plastics material. A higher proportion of anhydride leads to difficulties in processing the terpolymer, due to sticking to the tools and equipment. Furthermore, higher amounts of anhydride also lead to an overall reduction of the impact resistance of the laminated pane. Similarly, it is desirable for the proportion of vinyl acetate in said terpolymer to be between 15 and 35 and preferably between 20 and 30% by weight based on the terpolymer. Use of vinyl acetate in amounts outside of this range will not provide a terpolymer with adequate transparency of the adhesive film.

In addition, it is most preferable to produce the terpolymer by a statistical copolymerization reaction. In this manner, polymer is obtained with a distribution of maleic anhydride "in the mass" which is as homogeneous as possible. It is also preferable to carry out a first polymerization step between the ethylene and the vinyl acetate, and then a polymerization by addition of maleic anhydride to the polymer thus obtained.

Plastics Material Layer

The plastics material must have a transparency which is stable with respect to aging and weathering, and furthermore it must have an energy absorption suitable for a safety pane.

With regard to the formulation of the film of plastics material, it is preferred that the standard PVC polymer be used, along with various additives, so as to make the pane usable as a safety pane under extreme weather conditions. It is thus preferable to incorporate stabilizing agents which enable the PVC to resist, notably, ultra-violet radiation, without losing transparency. Such stabilizers are per se known in the art. Plasticizers can also be added, so that PVC will retain, notably, energy absorption capabilities (by reason of its flexibility) even at very low temperature, e.g., $-20°$ C.

As a preferred embodiment, from 20 to 50% by weight of plasticizing resins (PCR) are used. The PCR's are preferably selected from one or more of the adipates, azelates, phthalates or sebacates, either with alkyl chains, preferably $C_4$–$C_{12}$, or with mixed alkyl and alkylaryl chains as the ester groups.

It is also possible to use carboxylic esters of glycol.

Within the family of the adipates, dioctyl adipate (more precisely ethyl-2-hexyl dioctyl adipate) or octylbenzyl adipate are most preferred. Within the family of the azelates, octylazelate is also most preferred. In the family of the phthalates, dibutylphthalate is most preferred, and in the family of the sebacates, dibutylsebacate is most preferred.

The criterion for the additives is, on the one hand, good compatibility with the PVC and, on the other hand, excellent performance, particularly energy absorption at low temperature.

With regard to light stabilizers as additives, it is preferred to use the per se known substances that trap radical entities and/or hydrogen chloride that may be present. Mention may be made, as more preferred embodiments, of various tin salts, such as dibutyl tin dilaurate, or of products of vegetable origin, such as epoxy soya oil. By complementing or replacing these "trapping" substances, it is possible to complement or replace these substances by use of materials that fulfill the role of an ultraviolet filter, such as most preferably certain derivatives of benzotriazole or certain types of sterically hindered amines. It is also possible to incorporate these filters into the adhesive films as well.

These stabilizers are used preferably in a proportion of 2 to 12% by weight of plastics material resin.

Although it may be necessary, depending on the application, to use films based upon PVC of a non-negligible thickness, preferably from 250 to 1,000 micrometers, more preferably 380 to 760 micrometers for the purpose of laminated panes for buildings the adhesive films can be much thinner. Their thickness preferably ranges between 20 and 70 micrometers, more preferably 30 to 50 micrometers.

In the laminated panes according to this invention, the glass sheet or sheets may be of a non-annealed glass, of an annealed glass or of thermally or chemically toughened glass.

The method of production of the panes according to this invention is similar to the usual methods of assembling, consisting of stacking the elements of the laminated group and of subjecting this group to assembling by calendaring, followed by an autoclave cycle. The composite intermediate may be previously made up simultaneously by double or triple co-extrusion or by coating at least one of the faces of the PVC film with the adhesive film. It is desirable, once the composite intermediate has been formed, to give a relief surface structured state to the adhesive films in a manner per se known in the art. This irregular surface state makes possible, notably during the assembling together of the pane, better discharge of the air from the glass/intermediate assembly interface.

The characteristics and advantages of the invention will become apparent from the following detailed description of non-limiting examples thereof, provided with the help of a single FIGURE showing schematically a cross-section through the pane of this invention. The ratios of thickness of the various layers of material are not to scale, in the interests of clarity.

FIG. 1 shows a pane composed of two substrates 1, 5, between which is disposed the composite intermediate assembly of this invention, composed of a central PVC film 3 disposed between two adhesive terpolymer films 2, 4.

The laminated pane according to FIG. 1 corresponds to Examples 1 and 2, given below. Examples 3 and 4 are given for comparison purposes, and relate to panes having two substrates of glass and a single, standard intermediate sheet of PVB.

A description of the tests used in the Examples is given below. They are performed on each of the four panes obtained, all of which have dimensions 30×30 cm$^2$:

the ball impact test enables the behavior under impact of the laminated safety pane to be demonstrated. It is carried out in accordance with European Standard R 43, which set forth "the standard requirements relating to the approval of the safety pane and of the materials for panes intended to be fitted into motor vehicles and their trailers". The results of thus test are expressed in height of fall in feet.

the shear test T enables the shear strength of the assembly to be demonstrated. It is expressed in N/cm$^2$.

The results of these two tests for the four examples are assembled in Table A, below.

Two durability tests were carried out in conformity with the Standard NF-P 78-303 concerning laminated glasses for building panes:

the detachment resistance test consists of placing the pane for 14 days in a vertical position in saturated air at a temperature of 55° C. ±2° C., then for 7 days in an enclosure at 20° C. ±2° C. in air of relative humidity 30% ±5%. After the end of these two periods, no increase in any blistering nor any detachment over a width exceeding 7 mm from the edge should be observed. The third test consists of placing the pane for 3 minutes in water at 65° C., then for 2 hours in water at 100° C. Here again, no increase in the initial blistering, nor any detachment of more than 7 millimeters, should be observed.

the radiation resistance test consists of subjecting the pane perpendicularly to a light source constituted of an ultra-violet lamp at 230 mm distance, of 500 W power, emitting energy in a wavelength range from 300 to 450 nanometers with a distance between electrodes of 130 millimeters. The overall transmission according to illuminant C of the International Commission on Illumination before exposure and then after 100 hours exposure are measured. There should not be more than 5% difference between the two values, nor the appearance of inhomogeneity of color.

EXAMPLES

Having generally described this invention, a further understanding can be obtained by reference to certain specific examples which are provided herein for purposes of illustration only and are not intended to be limiting unless otherwise specified.

EXAMPLE 1

The glass substrates 1, 5 in FIG. 1 are of silico-sodo-calcic float glass of 3 millimeters thickness.

The sheet 3 of PVC has a thickness of 500 micrometers. The PVC contains plasticizers and stabilizers in the following proportions: 18% relative to the weight of the PVC resin of dioctyl adipate and 12% by weight relative to the PVC resin of dioctyl phthalate as plasticizers, 6% by weight relative to the PVC resin of an epoxy soya oil as light stabilizer.

The adhesive films 2 and 4 each have a thickness of 40 micrometers. They are based upon a terpolymer comprising maleic anhydride, vinyl acetate and ethylene, produced by statistical copolymerization. The proportion by weight of maleic anhydride is approximately 1% and that of the acetate approximately 26%.

The composite intermediate associating together the films 2, 3 and 4 is obtained by hot-calendaring. The assembling together of the films 2, 3, 4 and of the substrates 1, 5 is performed in a per se known manner by calendaring, followed by a final assembly using an autoclave cycle up to 150° C. under a pressure of approximately 10 bars, or 10$^6$ Pascals. The pane obtained is perfectly transparent and of good optical quality.

It passes the two durability tests successfully: no peeling or formation of blisters can be discerned.

EXAMPLE 2

This is in all points similar to Example 1, but in this case the glass substrates 1, 5 each have a thickness of 4 millimeters. They also successfully pass the two durability tests.

EXAMPLE 3 (Comparative)

This is constituted of two substrates of silico-sodo-calcic float glass of 3 millimeter thickness, and of a single intermediate sheet of PVB of 380 micrometers (this is a product sold commercially as a building pane).

The assembling is carried out by passing through an autoclave exactly as in Example 1.

EXAMPLE 4 (Comparative)

This is similar to Example 3, but in this case the thickness of the two glass substrates is 4 millimeters and that of the PVB sheet is 760 micrometers (It is also sold commercially).

TABLE A

| Example | Ball impact test | T shear test |
| --- | --- | --- |
| 1 | 18 | 110 ± 10 |
| 2 | 28 | 90 ± 30 |
| 3 | 8 | 190 ± 30 |
| 4 | 21 | 160 ± 20 |

A comparison of these examples having equal thicknesses of glass substrates (that in Examples 1 and 3, on the one hand, and 2 and 4, on the other hand) demonstrates a behavior under impact of the panes according to this invention are clearly superior to that of the standard panes with PVB, this being moreover quite unexpected.

Thus, it is found that the pane of Example 1 with a thickness of PVC film 3 approximately 1.4 times the thickness of the PVB sheet of Example 3 nevertheless gives a result in the ball impact test 2.25 times as high. Still more surprisingly, the pane of Example 2 according to this invention, with a PVC film thickness 34% smaller than the thickness of the PVB sheet of Example 4, nevertheless has a ball impact test result improved by a factor of 1.3. The film 3 of PVC according to this invention, in synergy with the two adhesive films 2, 4, is therefore proved to be quite clearly a better energy absorber. It is thus possible, according to the performances in terms of safety which it is desired to obtain, to modulate the thickness of the film 3 based upon PVC. It is thus possible to envisage panes having equal performances to those of panes with PVB, but with notably thinner films of PVC. This provides an obvious economic advantage, particularly since PVC is much less expensive than PVB.

Furthermore, it has been possible to observe in a more qualitative context that, according to the ball impact test, the panes of Examples 1, 2 according to this invention would exhibit, after breakage due to the impact, a clearly smaller "free surface" than the standard panes of Examples 3 and 4, which is an undeniable advantage from the aspect of safety: this "free surface" corresponds to the area of the intermediate sheet in the pane which remains bare after the pane is broken. The smaller this "free surface" is, the more it represents good retention of the splinters.

In contrast, the values of shear failure stress are slightly smaller for the panes of the invention in Examples 1 and 2 than for the panes of Examples 3 and 4. The values do, however, remain clearly adequate for preventing any cleavage in normal use, for example in a building. This arises from the fact that the failure modes in shear are extremely different for the two types of intermediate sheet assembly. In the case of the panes of this invention, the terpolymer of the adhesive films 2, 4 assures a high bond to the glass, and it is the interface between the films 2, 4 and the PVC film 3 which yields" first. It is this high adhesion between adhesive film and glass which enables the fragments of glass to be effectively retained in the case of a breakage. The PVC film 3, held less rigidly to the adhesive films, is thus able to absorb the energy in the case of shock more effectively.

It is also very important to note the behavior in durability of the panes of this invention is at least as good as that of the standard panes. PVC is considered more sensitive than the PVB to certain climatic conditions, such as temperature extremes.

It should also be noted in this connection that a specimen complying with Example 1, with the exception that the sheet 3 of PVC has a thickness of 300 micrometers, is able to withstand a completely moisture saturated atmosphere at approximately 60° C. for at least 3,000 hours without either exhibiting any discernible yellowing or creating any blisters; this is an extremely satisfactory result.

The laminated panes according to this invention offer an superior alternative to the already known laminated panes. They exhibit high mechanical performance characteristics using a PVC-based polymer, resulting in a saving in cost and raw materials which is substantial. Above all, these panes use a "composite" intermediate assembly which enables one or other of the plastics materials to be adapted, individually, according to the characteristic more particularly desired. Each of the materials is able to fulfil its specific function to the best advantage.

What is claimed as new and desired to be secured by Letters Patent of the United States is:

1. A laminated pane including at least one glass sheet and at least one film of plastics material comprising PVC and having a transparency which is stable with respect to aging and weathering and having an energy absorption suitable for a safety pane, wherein there is disposed an adhesive film between the glass sheet and film of plastics material, said adhesive film having a greater adhesion to the glass than to the film of plastics material, and wherein said adhesive film comprises a terpolymer comprised of ethylene, either vinyl acetate or acrylic ester, and maleic anhydride.

2. The laminated pane according to claim 1, wherein the percentage by weight of maleic anhydride in said adhesive film is between about 0.1 and 5%.

3. The laminated pane according to claim 2, wherein the terpolymer is obtained by statistical polymerization of ethylene, vinyl acetate and maleic anhydride.

4. The laminated pane according to claim 2, wherein the terpolymer contains 15 to 35% by weight of vinyl acetate.

5. The laminated pane according to claim 2, wherein the terpolymer contains 20 to 30% by weight of vinyl acetate.

6. The laminated pane according to claim 2, wherein the film of plastics material further comprises at least one plasticizer and/or stabilizer.

7. The laminated pane according to claim 1, comprising two glass sheets, between which is disposed, on either side of the film of plastics material, two adhesive films.

8. The laminated pane according to claim 7, wherein the film of plastics material has a thickness lying between 250 and 1,000 micrometers.

9. The laminated pane according to claim 7, wherein the adhesive film has a thickness of between 20 and 70 micrometers.

10. The laminated pane according to claim 7, further comprising at least one sheet of rigid plastics material disposed between a glass sheet and an adhesive film.

11. The laminated pane according to claim 10, wherein said rigid plastics material is selected from the group consisting of polycarbonate and polymethyl methacrylate.

12. A laminated pane comprising at least one glass sheet, at least one adhesive film, and at least one film of plastics material, wherein said adhesive film is disposed between said glass sheet and said film of plastics material, and wherein said adhesive film has a greater adhesion to the glass than to the film of plastics material and comprises a terpolymer of ethylene, vinyl acetate, and maleic anhydride, the maleic anhydride being present in the terpolymer in the amount of from about 0.1 to 5% by weight based on the terpolymer and wherein said plastics material has a transparency which is stable with respect to aging and weathering and has an energy absorption suitable for a safety pane.

13. A laminated pane including a composite between two glass sheets, wherein the composite comprises a plastic sheet comprising PVC and having a transparency which is stable with respect to aging and weathering and having an energy absorption suitable for a safety pane disposed between two adhesive films, said adhesive films having a greater adhesion to the glass than to the film of plastics material, wherein each of said adhesive films are composed of a terpolymer including 0.1 to 5% of maleic anhydride, by weight based on the terpolymer.

14. The laminated pane according to claim 13, wherein the terpolymer includes 0.5 to 2% of maleic anhydride, by weight based on the terpolymer.

15. A laminated pane including a glass sheet and sheet of rigid plastics material disposed on opposite sides of a composite structure, said composite structure comprising at least one adhesive film and a film comprising a plastics material, said plastics material having a transparency stable with respect to aging and weathering, and having an energy absorption suitable for a safety pane, and wherein said adhesive is disposed between said glass sheet and said film comprising a plastics material and said adhesive has a greater adhesion to the glass than to the film of plastics material and comprises a terpolymer including 0.1 to 5% maleic anhydride by weight based on the terpolymer.

16. The laminated pane according to claim 15, wherein the rigid plastics material is selected form the group consisting of polycarbonate and polymethyl methacrylate.

17. The laminated pane according to claim 16, wherein the film comprising a plastics material is a film including PVC.

18. A vehicle windshield according to claim 13, wherein said plastics material further comprises 20 to 50% by weight of at least one plasticizing resin.

19. A window for a building according to claim 13, wherein said plastics material further comprises 20 to 50% by weight of at least one plasticizing resin.

20. The laminated pane according to claim 12, wherein said plastics material comprises PVC.

* * * * *